May 1, 1962      G. J. BURKE      3,031,783
DEVICES FOR LOCATING OIL FILL CAPS OR BOXES
Filed Feb. 27, 1961
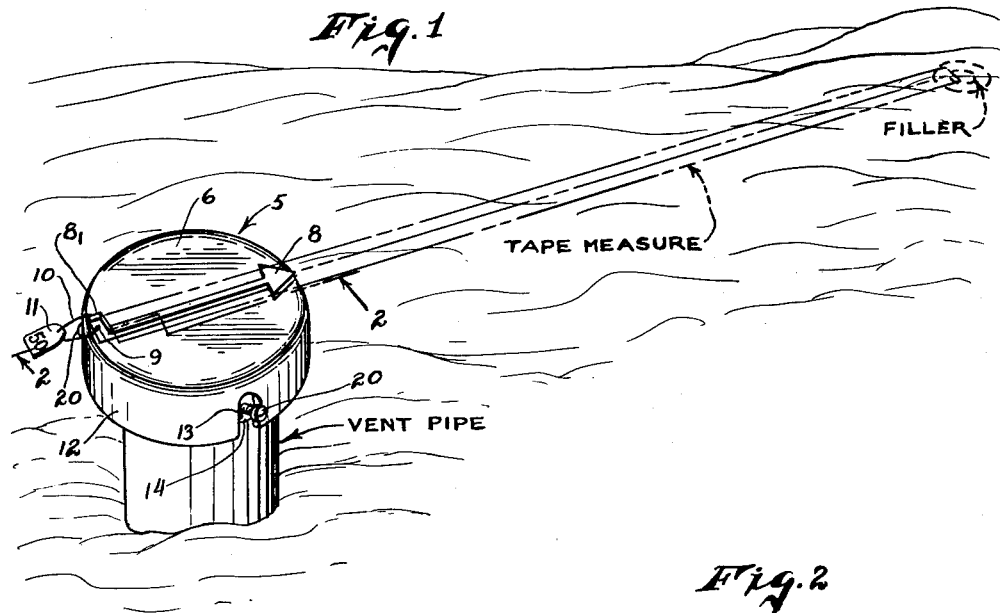
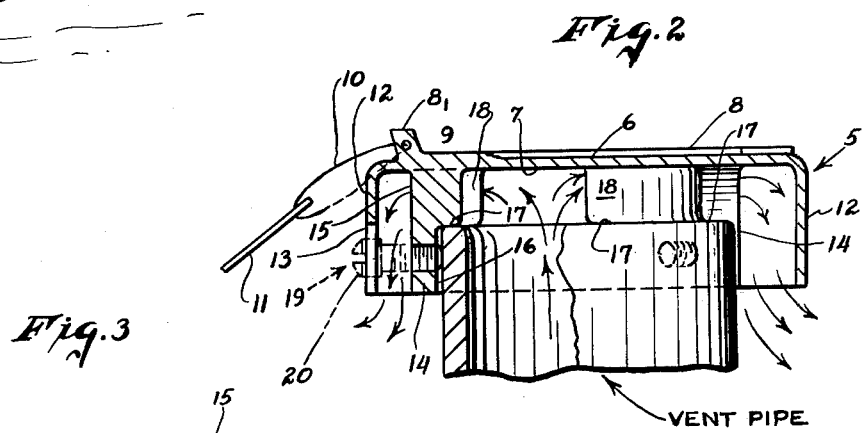
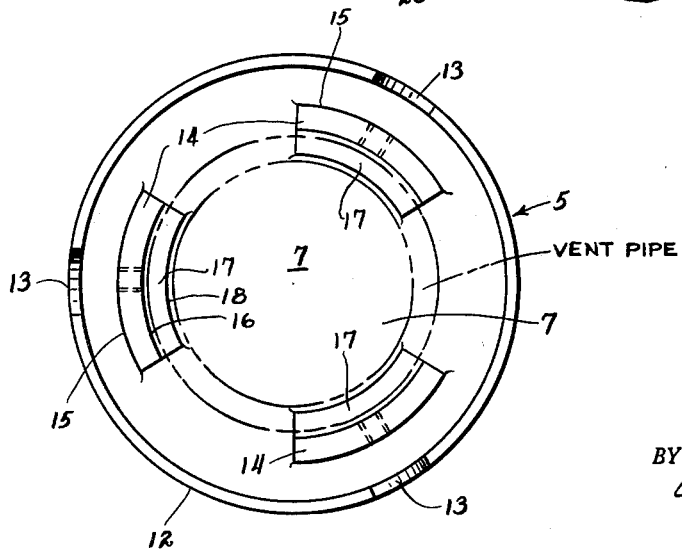
INVENTOR.
GEORGE J. BURKE
BY
*Edward F. Rae*
ATTORNEY

3,031,783
DEVICES FOR LOCATING OIL FILL CAPS OR BOXES

George J. Burke, 138 Old Saw Mill River Road, Hawthorne, N.Y.
Filed Feb. 27, 1961, Ser. No. 91,709
2 Claims. (Cl. 40—10)

My invention relates to new and useful means for locating the oil fill cap or box which is utilized in delivering oil or petroleum products.

By way of introduction, in home and other oil fired heating systems, the fuel storage tanks which are employed require both a vent and a delivery pipe outside the dwelling leading to and connected with the storage tank. The vent pipe usually extends a considerable distance above ground level and is permanently covered with a cap either threaded to or otherwise affixed to the top of the pipe with the oil fill cap or box usually mounted at ground level. Any measurable snowfall, therefore, usually covers and hides the fill cap or box and with the increased severity of winters, locating the fill cap is a difficult, time-consuming and wasteful job for the delivery truck driver who is hard-pressed under the best conditions to maintain his schedule. There have been occasions recently, duly reported in the press, when drivers have taken an hour or more digging in snow and ice to locate the oil fill cap. The vent cap is usually visible because it is above ground but the oil fill cap has to be located in order to connect the delivery hose thereto to fill the tank.

I have devised a vent cap for use in conjunction with the vent pipe and a measuring tape or instrument which has for its principal object the quick and efficacious location of the oil fill cap or box of fuel storage tanks. Another object is a cap which can be mounted on and secured to the vent pipe with facility. Another object is a vent cap which can be rotated to any desired position on the vent pipe and locked at the point desired with ease. In a modification I have provided a device mountable on the wall or side of a house for locating the oil fill cap. Other objects will be manifest after the specification unfolds.

Briefly described, my invention comprehends a cap having a circular top carrying a raised indicator, an obliquely angled lug, a vertically disposed rim provided with three recesses therein, a plurality of depending shouldered legs within the cap, the outer walls of the legs defining segments of a cylinder. Three lock screws are threaded through the legs with their heads accessible in the recesses in the rim. The device is characterized by compactness, ease of mounting and economy of manufacture. To enable the driver to quickly locate the oil fill cap without reference to the customer's delivery record card, the lug on the cap may be apertured and hold a tag bearing the correct measurement from the vent cap to the oil fill cap. Because of the aforesaid economy of manufacture, it would cost the fuel oil distributor a modest sum to purchase enough caps to equip all of the vents of his fuel oil customers.

It is clear that my invention, in enabling the fuel delivery driver to quickly locate the oil fill cap without digging through ice and snow, would result in substantial savings in time, energy and money.

FIG. 1 is a perspective view of my invention.
FIG. 2 is a cross section taken along lines 2—2 of FIG. 1.
FIG. 3 is a bottom elevational view of the cap with the vent pipe in phantom.

For the purpose of explication, I have marshalled below the numbered parts of the invention:

5—a vent cap
6—top of cap
7—inside bottom of cap
8—indicator
$8_1$—angled rug
9—aperture in lug
10—wire through aperture
11—tag on wire
12—depending rim of cap
13—openings in rim
14—inner legs
15—outer wall of legs 14
16—inner lower wall of legs
17—shoulders of legs 14
18—upper inner walls of legs 14
19—lock screws
20—heads of lock screws For the purpose of illustrating the present invention I have shown it in FIG. 1 mounted on a vent pipe P and as cross sectionally depicted in FIG. 2 my vent cap 5 includes top 6, bottom 7, with indicator 8 formed integrally with the top, having obliquely angled lug $8_1$ at one end. This lug may have aperture 9 for receiving wire 10 for use in conjunction with a tag or tab 11 on which a measurement may be scratched or marked thereon. This tag 11 may be a disk of lead or other suitable material. Cap 5 may be cast, stamped, or otherwise constructed of aluminum, magnesium and alloys thereof, or any other suitable metal, and I comprehend that it may be formed of man-made materials such as plastics having the necessary inherent strength, rigidity and resistance to the elements.

At right angles to top 6 is disposed a rim or flange 12 provided with recesses or openings 13 which may be in the shape of an inverted U. I have illustrated three such recesses 13 but I contemplate there may be more or less, depending on the number of inner legs 14, which should be sufficient in any event to hold cap 5 securely affixed to the upper end of vent pipe P.

Legs 14 are disposed vertically from bottom 7 of the cap 5 and have outer peripheral walls 15, inner lower walls 16, and shoulder 17 which are so dimensioned as to receive upper end E of vent pipe P. The spaces between legs 14 permits the venting of vapors from the oil or petroleum products and then the vapors emanate between rim 12 and outer walls 15 of legs 14. Lock screws 19 are screw-threaded through legs 14 and their heads 20 are aligned with recesses 9.

The manner of using the vent cap is as follows: The oil delivery vehicle operator removes the conventional vent cap and replaces with cap 5, tightening lock screws 19 sufficiently to allow the cap to be turned 360° on the top of the vent pipe P. The end of a tape measure is then placed on lug 9 and drawn taut over the oil fill cap or box C. With the tape measure held in this fashion, the driver's assistant rotates cap 5 so that the raised directional marking 8 indicates the direction of the fill cap or box. When thus positioned, lock screws 19 are fully tightened to anchor the cap 5 securely on vent pipe P. The number of feet measured on the tape from lug $8_1$ to the center of oil fill cap O is scratched or otherwise marked on tab 11 and noted both in the driver's delivery record card and the office customer's record card. When delivering fuel thereafter, the driver hooks the tape measure on lug $8_1$ and measures the distance noted to the oil fill cap following the path indicated by the arrow indicator 8. There is no necessity for digging in snow or ice to search for the oil fill cap or box, time is saved and economies are substantial.

In the specification and claims where reference is had to oil fill caps, it is intended to encompass boxes which are opened to uncover the oil fill cap.

I am aware that my invention may be embodied in other specific forms without departing from the spirit or essential attributes thereof, and I therefore desire the present embodiments to be considered in all respects as illustrative and not restrictive, reference being had to the appended claims.

I claim:

1. A vent cap for use on the vent pipe of a liquid fuel storage tank having a separate oil fill pipe and cap to facilitate location of said oil fill cap, comprising a cap having an outside top and an oppositely disposed inside bottom, a directional marking and a lug on the top, an integral rim depending from the top having three recesses therein, a plurality of depending shouldered legs underneath the top and interior of the rim defining segments of a circle of less diameter than the rim, the shoulders and inner walls of the legs adapted to receive the top rim of the vent pipe and rest thereon, screws threaded through the legs having their heads aligned with the recesses in the rim whereby the vent pipe cap can be locked in position with the directional marking aimed at the oil fill cap upon tightening the screws to engage the vent pipe.

2. A vent cap as described in claim 1 wherein the lug is apertured and carries a tag for the reception of measurement data.

References Cited in the file of this patent
UNITED STATES PATENTS

| | | |
|---|---|---|
| 2,601,820 | Paul | July 1, 1952 |
| 2,617,215 | Morris | Nov. 11, 1952 |
| 2,781,941 | Lindsay | Feb. 19, 1957 |
| 2,825,276 | Porter | Mar. 4, 1958 |